US008478004B2

(12) United States Patent
Lee et al.

(10) Patent No.: US 8,478,004 B2
(45) Date of Patent: Jul. 2, 2013

(54) METHOD OF CONTROLLING DIGITAL IMAGE PROCESSING APPARATUS FOR PERFORMING MOVING PICTURE PHOTOGRAPHING MODE, AND DIGITAL IMAGE PROCESSING APPARATUS USING THE METHOD

(75) Inventors: Seung-yun Lee, Seongnam-si (KR); Tomonaga Yasuda, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 955 days.

(21) Appl. No.: 12/156,837

(22) Filed: Jun. 5, 2008

(65) Prior Publication Data

US 2008/0317296 A1    Dec. 25, 2008

(30) Foreign Application Priority Data

Jun. 22, 2007   (KR) ......................... 10-2007-0061855

(51) Int. Cl.
*G06K 9/00*   (2006.01)

(52) U.S. Cl.
USPC ......................................................... 382/118

(58) Field of Classification Search
None
See application file for complete search history.

(56) References Cited

U.S. PATENT DOCUMENTS

| 6,097,431 | A | 8/2000 | Anderson et al. | |
|---|---|---|---|---|
| 7,669,127 | B2 * | 2/2010 | Hull et al. | 715/716 |
| 7,911,510 | B2 * | 3/2011 | Chosa et al. | 348/231.99 |
| 7,961,241 | B2 * | 6/2011 | Yuyama | 348/333.02 |
| 7,986,372 | B2 * | 7/2011 | Ma et al. | 348/700 |
| 2005/0180730 | A1 | 8/2005 | Huh et al. | |
| 2006/0026524 | A1 | 2/2006 | Ma et al. | |

FOREIGN PATENT DOCUMENTS

| CN | 1658663 A | 8/2005 |
|---|---|---|
| JP | 2000-222439 A | 8/2000 |
| JP | 2004-254065 A | 9/2004 |
| JP | 2005-184348 A | 7/2005 |

OTHER PUBLICATIONS

W.-Y. Ma and H.J. Zhang, An Indexing and Browsing System for Home Video, In Proc. of European Conference on Signal Processing, Greece, Sep. 2000.*
Office Action established for CN 200810095590.5 (Aug. 8, 2011).
Office Action established for CN 200810095590.5 (Mar. 26, 2012).
Office Action established for CN 200810095590.5 (Jul. 4, 2012).

* cited by examiner

*Primary Examiner* — Claire X Wang
*Assistant Examiner* — Thomas A James
(74) *Attorney, Agent, or Firm* — Drinker Biddle & Reath LLP

(57) ABSTRACT

A method of controlling a digital image processing apparatus that performs a moving picture photographing mode and a reproduction mode. The method includes the operations of detecting face frames where faces of different persons exist in an operations of storing images of a series of frames in a moving picture file in the moving picture photographing mode, storing representative image frames including face frames selected from the detected face frames in the moving picture photographing mode, and displaying images of the stored representative image frames to indicate the moving picture file in the reproduction mode. The method can be performed by a controller of the digital image processing apparatus.

20 Claims, 12 Drawing Sheets

METHOD OF CONTROLLING DIGITAL IMAGE PROCESSING APPARATUS FOR PERFORMING MOVING PICTURE PHOTOGRAPHING MODE, AND DIGITAL IMAGE PROCESSING APPARATUS USING THE METHOD

CROSS-REFERENCE TO RELATED PATENT APPLICATIONS

This application claims the benefit of Korean Patent Application No. 10-2007-0061855, filed on Jun. 22, 2007, in the Korean Intellectual Property Office, the disclosure of which is incorporated herein in its entirety by reference.

BACKGROUND OF THE INVENTION

1. Field of the Invention

The present invention relates to a method of controlling a digital image processing apparatus, and more particularly, to a method of controlling a digital image processing apparatus performing a moving picture photographing mode and reproduction mode.

2. Description of the Related Art

A conventional digital image processing apparatus, such as a digital camera, has been disclosed, for example, in U.S. Pat. No. 6,097,431 entitled "Method And System For Reviewing And Navigating Among Images On An Image Capture Portion." In the photographing method disclosed in that patent, a moving picture photographing mode, a continuous photographing mode, and a general photographing mode are performed, and moving picture files and/or still image files are stored in a recording medium.

In the reproduction mode, the first frame of a moving picture is displayed to show the content of the moving picture. However, it is difficult for a user to know the content of the moving picture only from the first frame. Accordingly, the user inconveniently needs to reproduce the moving picture to know the content of the moving picture. That is, to find a moving picture file having a desired content, the user may need to reproduce a large portion of the moving picture.

SUMMARY OF THE INVENTION

To address the above and/or other problems, the present invention provides a method of controlling a digital image processing apparatus and a digital image processing apparatus using the same so that a moving picture file having a desired content can be easily found.

Accordingly, an embodiment of the present invention provides a method of controlling a digital image processing apparatus that performs a moving picture photographing mode and a reproduction mode. The method comprises detecting face frames where faces of different persons exist in an operation of storing images of a series of frames in a moving picture file in the moving picture photographing mode, storing representative image frames including face frames selected from the detected face frames in the moving picture photographing mode, and displaying images of the stored representative image frames to indicate the moving picture file in the reproduction mode. The digital image processing apparatus can include a main controller using this control method.

In the reproduction mode, images of representative image frames where faces of different persons exist can be displayed for a moving picture file.

Thus, a user can easily know the content of a corresponding moving picture file while viewing the representative image frames where faces of different persons exist. Also, the user does not need to briefly reproduce a moving picture to know the content of the moving picture file. That is, the user does not need to briefly reproduce more moving picture files to find a moving picture file having a desired content. As a result, the user can more readily find a moving picture file having a desired content.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE EMBODIMENTS

Figure 1:
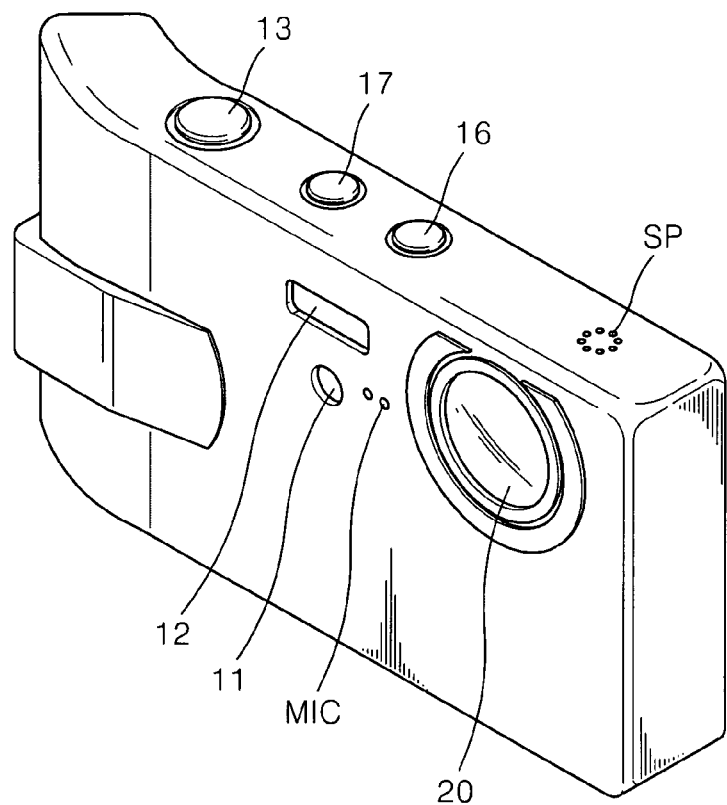
FIG. 1 is a perspective view showing the front and upper sides of an example of a digital camera as an example of a digital image processing apparatus using a control method according to an embodiment of the present invention.

Referring to FIG. 1, a self-timer lamp 11, a flash 12, a shutter release button 13, an ASR (advanced shake reduction) mode button 16, a power button 17, a lens portion 20, a microphone MIC, and a speaker SP are arranged on the front and upper sides of a digital camera 1 as an example of a digital image processing apparatus using a control method according to an embodiment of the present invention. The self-timer lamp 11 in this example is operated in a self-timer mode for a set time from the time when the shutter release button 13 is pressed till the time when an image is captured. The self-timer lamp 11 generates an auxiliary light according to the selection by a user.

The ASR mode button 16 is used to compensate for hand movement or other shaking. Also, the ASR mode button 16 is used as a lock button. For example, when the ASR mode button 16 is pressed for less than one second, a shake compensation function is performed. When the ASR mode button 16 is pressed for more than one second, a lock function is performed in a reproduction mode.

The shutter release button 13 has a two-step structure. That is, when a user half-presses the shutter release button 13 after manipulating a wide-zoom button $39_W$ and a tele-zoom button $39_T$, an SH1 signal from the shutter release button 13 is turned on. When the user fully presses the shutter release button 13, an SH2 signal from the shutter release button 13 is turned on. In a still image photographing mode and a moving picture photographing mode, an image is captured after the SH2 signal is turned on. In a continuous photographing mode, images are continuously captured while the SH1 signal is turned on.

Figure 2:
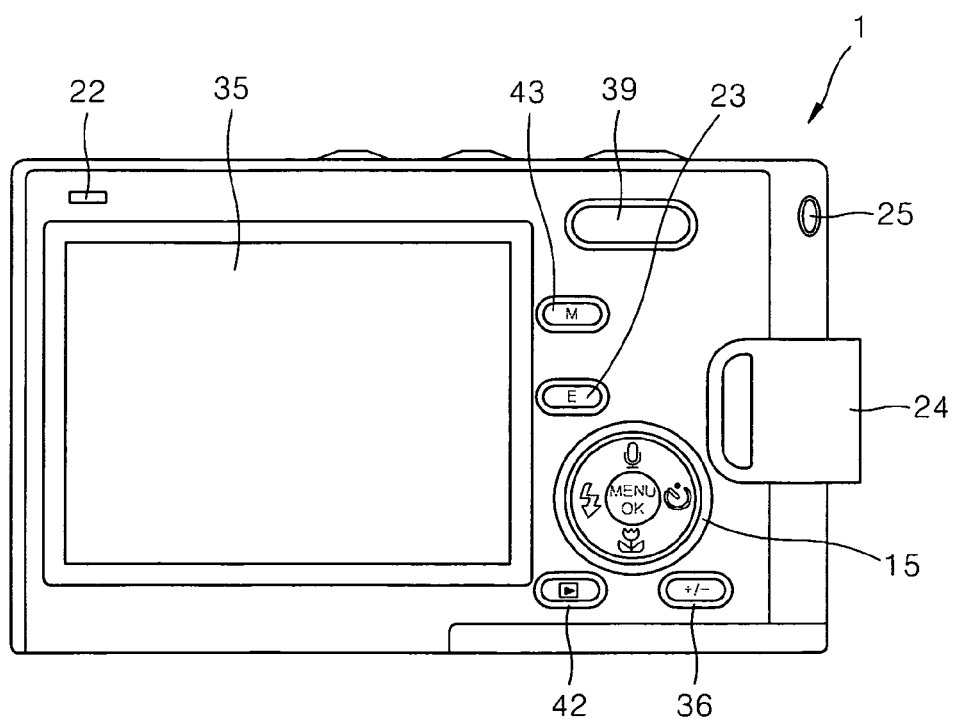
FIG. 2 is a rear view of the digital camera of FIG. 1.

Referring to FIG. 2, a plurality of function buttons 15, a camera-state lamp 22, a special effect button 23, a camera strap ring 24 an earphone connection portion 25, a display panel 35, a +/− button 36, a zoom/9 sections/volume button 39, a reproduction/printer button 42, and a mode button 43 are arranged on the rear side of the digital camera 1. The function buttons 15 are used to perform special functions of the digital camera 1, used as direction/movement buttons for an active cursor on a menu screen of the display panel 35, and used to change files and recording media subject to reproduction in the reproduction mode. The camera-state lamp 22 is used to show a variety of operation states of the camera. The special-effect button 23 is used to set special effects to a photographed image.

In this embodiment, the display panel 35 is a touch screen, but can be any suitable type of screen or input/output device. The +/− button 36 is used to control the shutter speed for photographing a night view. The zoom/9 sections/volume button 39 is used to perform a zooming operation in the photographing or reproduction mode, display a total of nine images on a single screen in the reproduction mode, or control the volume of audio. The reproduction/printer button 42 is used to change a mode between the reproduction mode and a preview mode or for direct output to a printer. The mode button 43 is used to select a PMP (portable media player) mode or various photographing modes.

Figure 3:
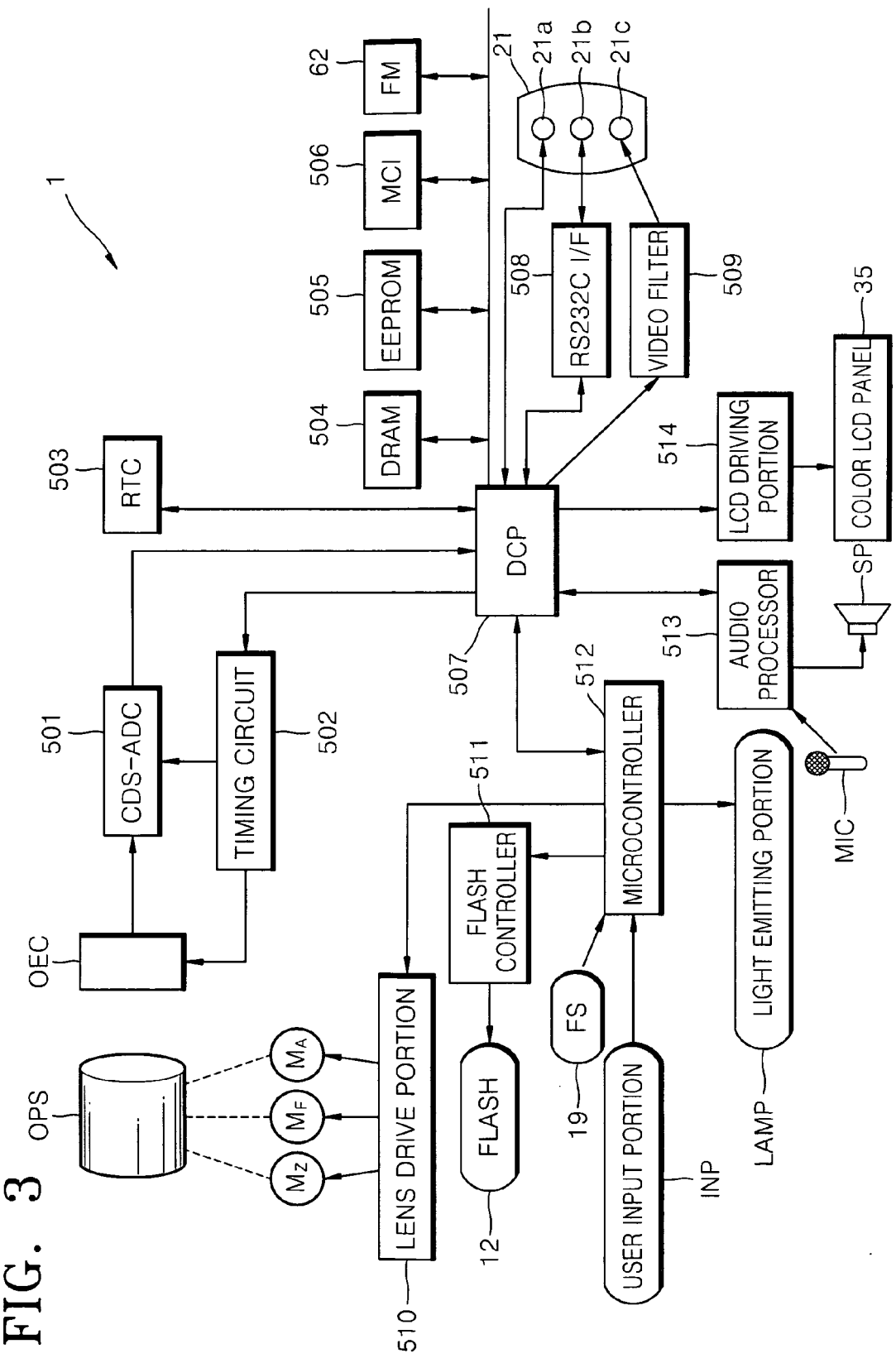
FIG. 3 is a block diagram showing an example of the configuration of the digital camera of FIG. 1.

FIG. 3 shows an example of the overall configuration of the digital camera 1 of FIG. 1. Referring to FIGS. 1 through 3, an example of the overall configuration and operation of the digital camera 1 of FIG. 1 are described below.

An optical system OPS including a lens portion and a filter portion optically processes light reflected from an object. The lens portion of the OPS includes a zoom lens, a focus lens, and a compensation lens. In the preview mode or moving picture photographing mode, when a user presses the zoom/9 sections/volume button 39 included in a user input portion INP, a corresponding signal is input to a microcontroller 512. Accordingly, as the microcontroller 512 controls a lens drive portion 510, a zoom motor Mz is driven to move the zoom lens.

In an automatic focusing mode, a main controller included in a digital camera processor 507 controls the lens drive portion 510 through the microcontroller 512 so that the focus motor $M_F$ is driven. Accordingly, the focus lens is moved to a position according to the number of drive steps of the focus motor $M_F$, for example, to a position where the high frequency component of an image signal is the largest. Reference letter $M_A$ denotes a motor for driving an aperture (not shown).

An OEC (optoelectric converter) of a CCD (charge coupled device) or a CMOS (complementary metal-oxide-semiconductor) converts the light from the OPS to electric analog signal. The digital camera processor 507 as a main controller controls a timing circuit 502 to control the operations of the OEC and an analog-digital conversion portion 501 by controlling the timing circuit 502. A CDS-ADC (correlation double sampler and analog-to-digital converter) as an example of the analog-digital conversion portion 501 processes an analog signal from the OEC to remove high frequency noise and control the amplitude thereof, and converts the analog signal to a digital signal.

A real-time clock (RTC) 503 provides time information to the digital camera processor 507. The digital camera processor 507 processes the digital signal from the CDS-ADC 501 to generate a digital image signal divided into brightness and chromatic signals. A light emitting portion LAMP driven by the microcontroller 512 according to control signals from the digital camera processor 507 including a main controller includes a self-timer lamp 11 and a camera-state lamp 22.

The user input portion INP includes the shutter release button 13, the function buttons 15, the ASR mode button 16, the power button 17, the special-effect button 23, the +/− button 36, the zoom/9 sections/volume button 39, the reproduction/print button 42, and the mode button 43.

The digital image signal from the digital camera processor 507 is temporarily stored in a DRAM (dynamic random access memory) 504. Algorithms needed for the operation of the digital camera processor 507 are stored in an EEPROM (electrically erasable and programmable read only memory) 505. A user's memory card is inserted in or separated from an MCI (memory card interface) 506. Setting data needed for the operation of the digital camera processor 507 is stored in an FM (flash memory). A plurality of memory cards as user's recording media are inserted in or separated from the MCI 506.

The digital image signal from the digital camera processor 507 is input to an LCD driving portion 514 and accordingly an image is displayed on the display panel 35. In an interface portion 21, the digital image signal from the digital camera processor 507 is transmitted serially through a USB (universal serial bus) connection portion 21a, or an RS232C interface 508 and an RS232C connection portion 21b, and as a video signal through a video filter 509 and a video output portion 21c.

An audio processor 513 outputs a voice signal from the microphone MIC to the digital camera processor 507 or the speaker SP and the audio signal from the digital camera processor 507 to the speaker SP. The microcontroller 512 drives the flash 12 by controlling the operation of a flash controller 511 according to a signal from a flash-light amount sensor 19.

Figure 4:
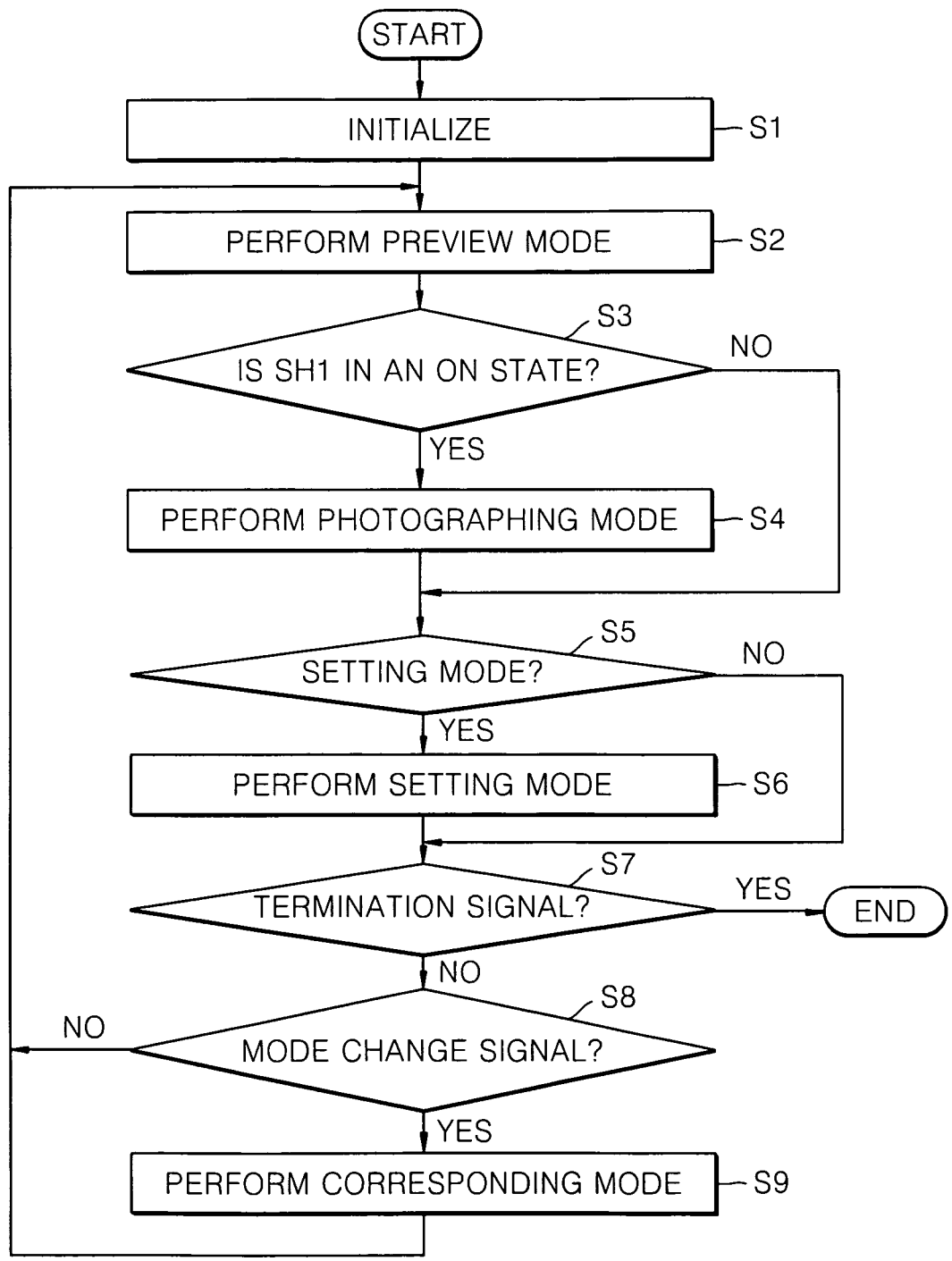
FIG. 4 is a flow chart for explaining an example of a main algorithm of a digital camera processor of FIG. 3.

FIG. 4 illustrates an example of a main algorithm of the digital camera processor of FIG. 3. Referring to FIGS. 1 through 4, in the main algorithm of the digital camera processor 507, when an operation power is applied to the digital camera 1, the digital camera processor 507 performs initialization in step S1. Then, the digital camera processor 507 performs a preview mode in step S2. In the preview mode, an input image is displayed on the display panel 35.

Next, when the SH1 signal that is the first step signal from the shutter release button 13 is on in step S3, the digital camera processor 507 performs a photographing mode in step S4. When signals corresponding to a setting mode are input from among the input signals from the INP in step S5, the setting mode to set operation conditions is performed according to the input signals from the INP (S6).

Figure 5:
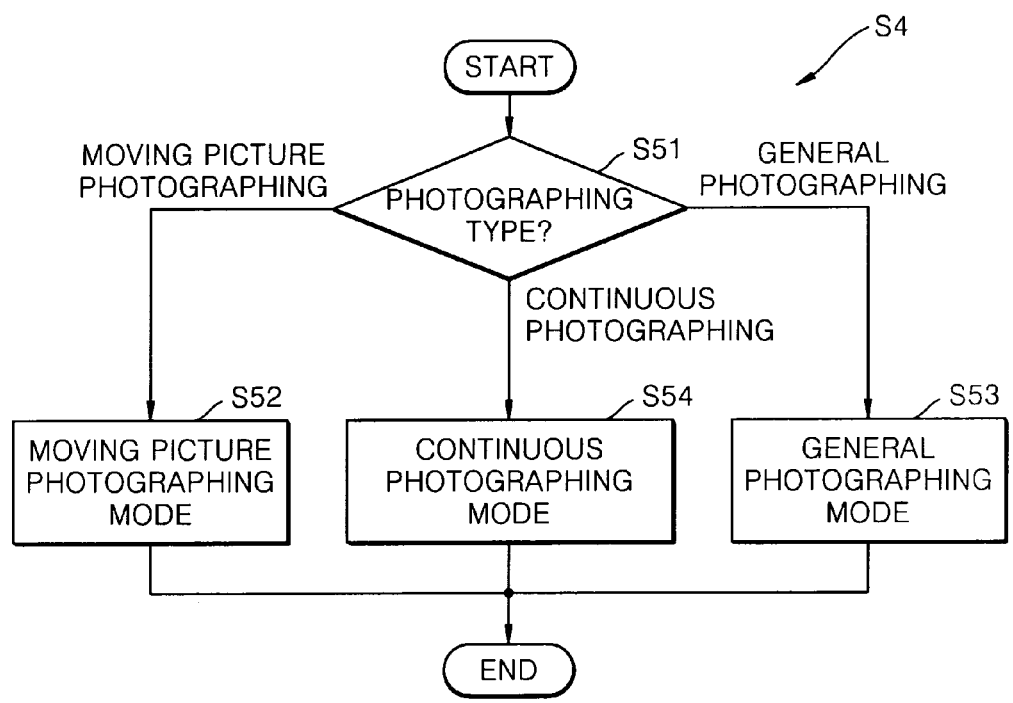
FIG. 5 is a flow chart for explaining an example of how the photographing mode of FIG. 4 is classified.

When a conversion mode to another arbitrary mode is not generated in the S8, the digital camera processor 507 repeats step S2 and the subsequent step. When in step S8 the conversion signal to the other arbitrary mode is generated, the digital camera processor 507 performs a corresponding mode in step S9 and repeats step S2 and the subsequent steps. Referring to FIG. 5, in step S51, the digital camera processor 507 determines a photographing type that is presently set, and performs a moving picture photographing mode in step S52, a general photographing mode in step S53, or a continuous photographing mode in step S54 according to the presently set photographing type.

Figure 6:
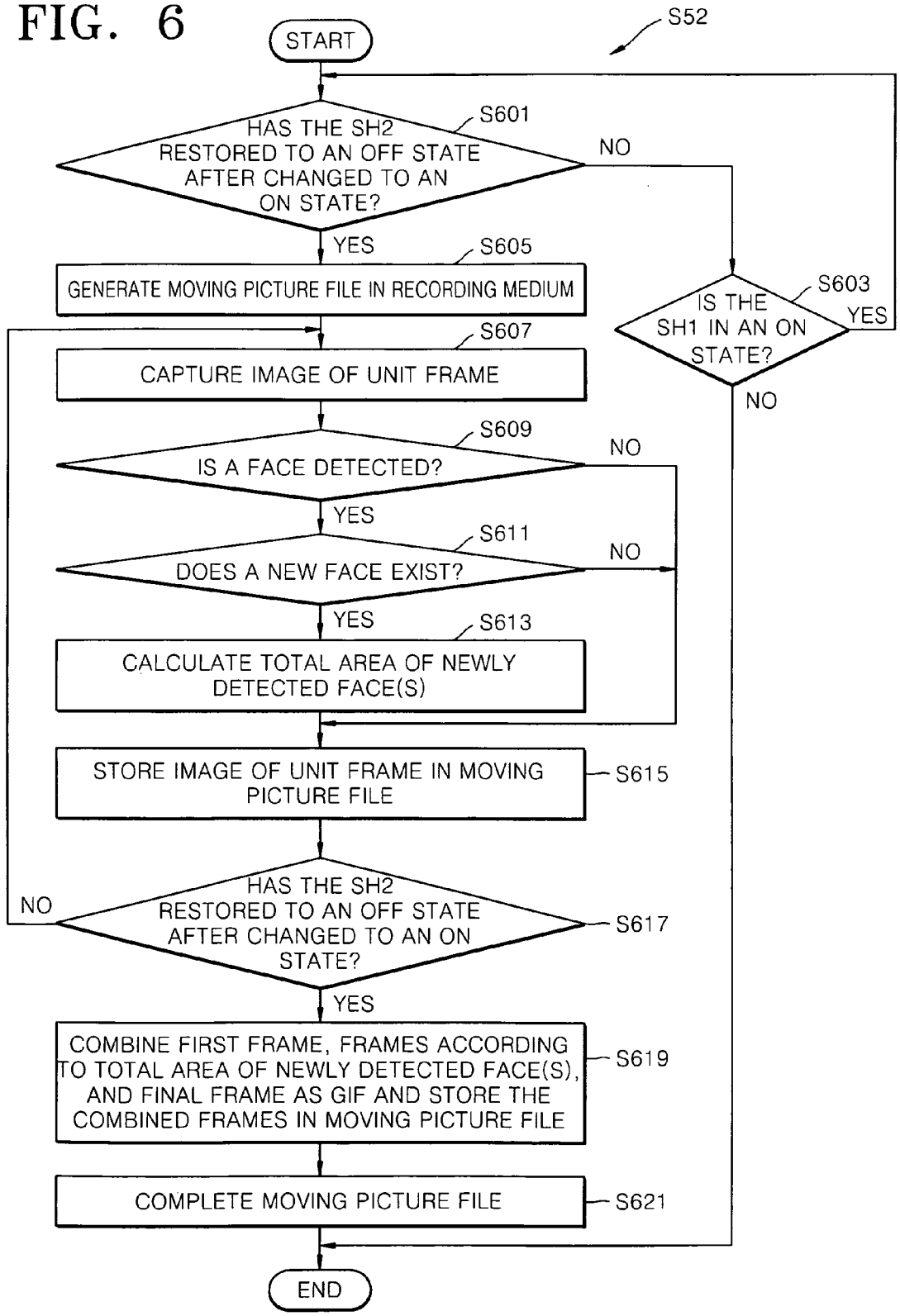
FIG. 6 is a flow chart for explaining an example of an algorithm of the moving picture photographing mode of FIG. 5.
Figure 7:
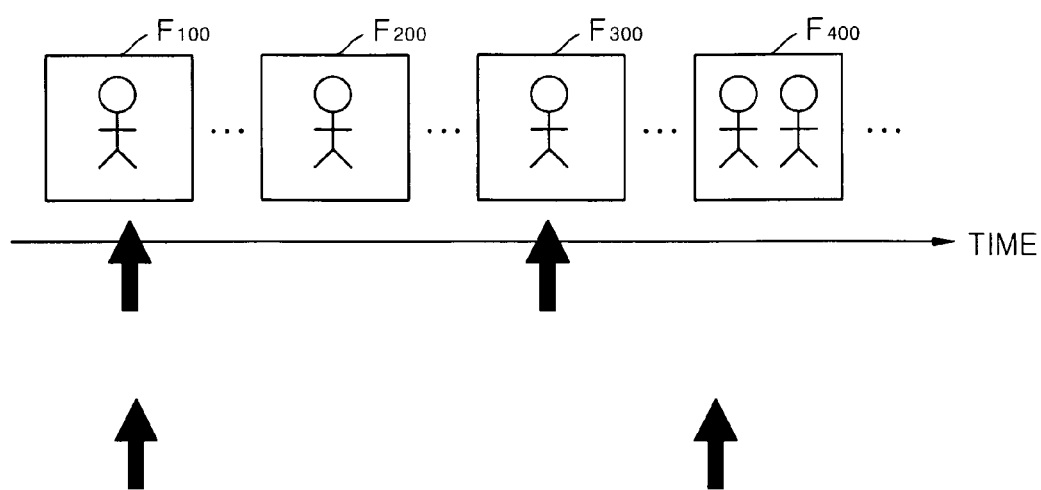
FIG. 7 illustrates an example of how face frames of faces of difference persons are detected by the algorithm of FIG. 6.
Figure 8:
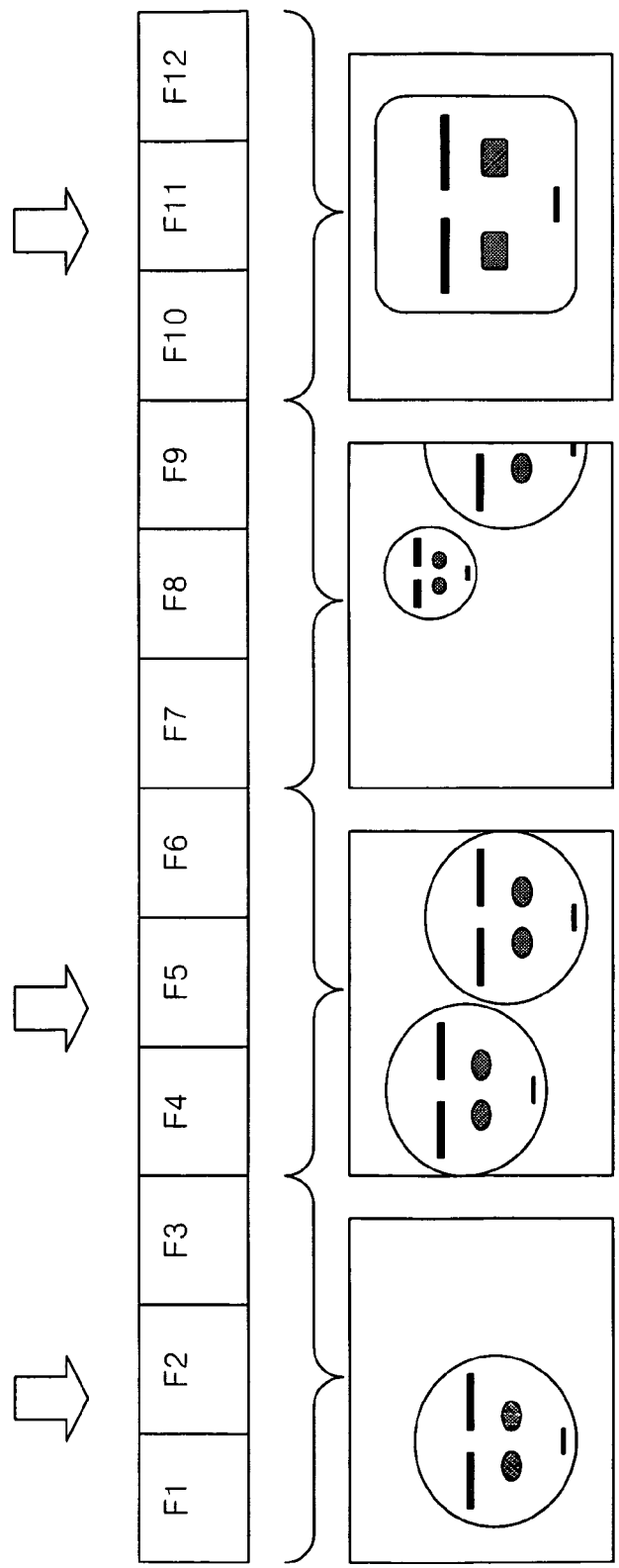
FIG. 8 illustrates an example of how face frames are selected in order of largeness in a face size to set representative image frames in S619 of FIG. 6.

FIG. 6 illustrates an example of the algorithm of the moving picture photographing mode (step S52 in FIG. 5) of FIG. 5. FIG. 7 illustrates an example of how face frames ($F_{100}$ and $F_{400}$) of faces of different persons are detected by the algorithm of FIG. 6. FIG. 8 illustrates an example of how face frames (F2, F5, and F11) are selected in order of largeness in a face size to set representative image frames in step S619 of FIG. 6.

Referring to FIGS. 1, 3, and 6-8, the algorithm of the moving picture photographing mode (step S52 in FIG. 5) is as follows. First, the digital signal processor 507 determines in step S601 whether the SH2 signal, that is, the second step signal from the shutter release button 13, is restored to an OFF state from the ON state. When the SH2 signal has not been converted to the ON state, the user does not generate a moving picture photographing start signal. Thus, the digital signal processor 507 determines in step S603 whether the SH1 signal, that is, the first step signal from the shutter release button 13, is in the ON state.

When the SH1 signal is in the ON state in step S603, the user intends to start moving picture photographing so that step S601 is performed again. Otherwise, the user does not intend to start the moving picture photographing so that the performing of a program is terminated. In step S601, when the SH2 signal has been converted to the ON state, which is a state in which the user generates a photographing start signal, the digital signal processor 507 performs the following operations.

First, the digital signal processor 507 generates a moving picture file in a recording medium, for example, a memory card, in step S605. Then, the digital signal processor 507 captures an image of a unit frame in step S607. Also, the digital signal processor 507 determines whether a face(s) exists in the captured image (S609).

When the face(s) is detected in step S609, the digital signal processor 507 determines whether a new face(s) exists in the detected face(s) in S611. That is, when the face(s) is detected at the present frame, the digital signal processor 507 compares the new face with the faces of the detected face frames to determine the existence of a new face in the present frame.

For example, referring to FIG. 7, when representative images are simply periodically set, the $100^{th}$ frame $F_{100}$ and the $300^{th}$ frame $F_{300}$ are the representative images. However, since there is a possibility that the same face exist in the $F_{100}$ and $F_{300}$, the $F_{100}$ and $F_{300}$ are not appropriate as a limited number of the representative image frames. In contrast, when the face frames, for example, $F_{100}$ and $F_{400}$, where faces of different persons exist are detected and used as the representative image frames, the face frames are very appropriate as a limited number of the representative image frames.

When a new face(s) exists as determined in step S611, that is, the present frame is a face frame that can be included in the representative image frames, the digital signal processor 507 calculates the total area of a face of the present frame in step S613. Also, the digital signal processor 507 stores an image of the present unit frame in a moving picture file in step S615. Next, the digital signal processor 507 determines whether the SH2 signal is converted to the ON state and restored to the OFF state in step S617.

If in step S617 the SH2 signal has not been converted to the ON state, which is a state in which the user does not generate a moving picture-photographing termination signal, the digital signal processor 507 repeatedly performs steps S607 through S615. If in step S617 the SH2 has been converted to the ON state, which is a state in which the user generates the moving picture-photographing termination signal, the digital signal processor 507 performs the following steps S619 and S621 and terminates the program.

In step S619, the digital signal processor 507 combines the first frame, that is, frames according to the total area of a newly detected face(s), for example, F2, F5, and F11, and the final frame as a GIF (graphics interchange format), and stores the GIF in the moving picture file. The representative image frames combined in the GIF can be stored in a recording medium as a separate file at a position different from the position of the moving picture file.

In step S619, as the number of the representative image frames is limited, face frames selected in order of largeness in the total face area, for example, F2, F5, and F11, are included in the representative image frames. Of course, when a face exists in either the first frame or the final frame, a newer face compared to the first frame or final frame exists in each of the face frames, for example, F2, F5, and F11, selected according to the order of the total area of a face(s).

Referring to FIG. 8, it is assumed that the total area of a face existing in the first through third frames F1-F3 is 100, the total area of two faces existing in the fourth through sixth frames F4-F6 is 200, the total area of a face existing in the seventh through ninth frames F7-F9 is 30, and the total area of a face existing in the tenth through twelfth frames F10-F12 is 150. The half face existing in the seventh through ninth frames F7-F9 is not detected in the face detection step S609.

Thus, when three face frames are selected, the first frame F1, the fourth frame F4, and the tenth frame F10 are selected in order of largeness of the total face area. However, it is preferable to select the second frame F2 having the same face as the first frame F1, the fifth frame F5 having the same face as the fourth frame F4, and the eleventh frame F11 having the same face as the tenth frame F10. This is because the first frame at a scene change point may be shaken. In step S621, the digital signal processor 507 completes the moving picture file.

To summarize, in steps S607 through S617, the face frames, for example, $F_{100}$ and $F_{400}$, where faces of different persons exist are detected in the step of storing images of a series of frames in a moving picture file. In step S619, representative image frames including face frames, for example, F2, F5, and F11, selected from the detected face frames are stored.

The images of the stored representative image frames, for example, the first frames F2, F5, F11, and the final frame, are displayed to show the moving file in the reproduction mode. Accordingly, the user can easily see what is the content of the moving file while viewing the representative image frames, for example, the first frame, F2, F5, F11, and the final frame, where the faces of different persons exist. Thus, the user does not need to reproduce a large portion of the moving picture to know the content of the moving picture. That is, the user does not need to briefly reproduce more moving picture files to find a moving picture file having a desired content. Consequently, the user can more readily find a moving picture file having a desired content.

For reference, the algorithm for face recognition used in step S609 can be any suitable technique. For example, the face recognition algorithm can be the type used in an entrance control system, a work behavior management system, a real-time monitoring system, a video conference, user authentication, file encoding, toys, and remote education, to name a few. Although a variety of face recognition technologies may exits, when face recognition speed is needed as in the embodiments of the present invention, a face recognition technology using geometrical characteristics of a face is appropriate. This technology can be considered as perhaps the most widely used from among the various face recognition technologies. According to the technology, the face of an individual is recognized using geometrical factors such as the position and size of each of characteristic points such as an eye, a nose, and a mouth, and the distance between the characteristic points. The geometrical characteristics include factors that remain intact even when the resolution of an input image is decreased. Thus, since in step S609 face recognition is performed after the resolution of an image of a unit frame is decreased, the processing speed of step S609 can be increased.

Figure 9:
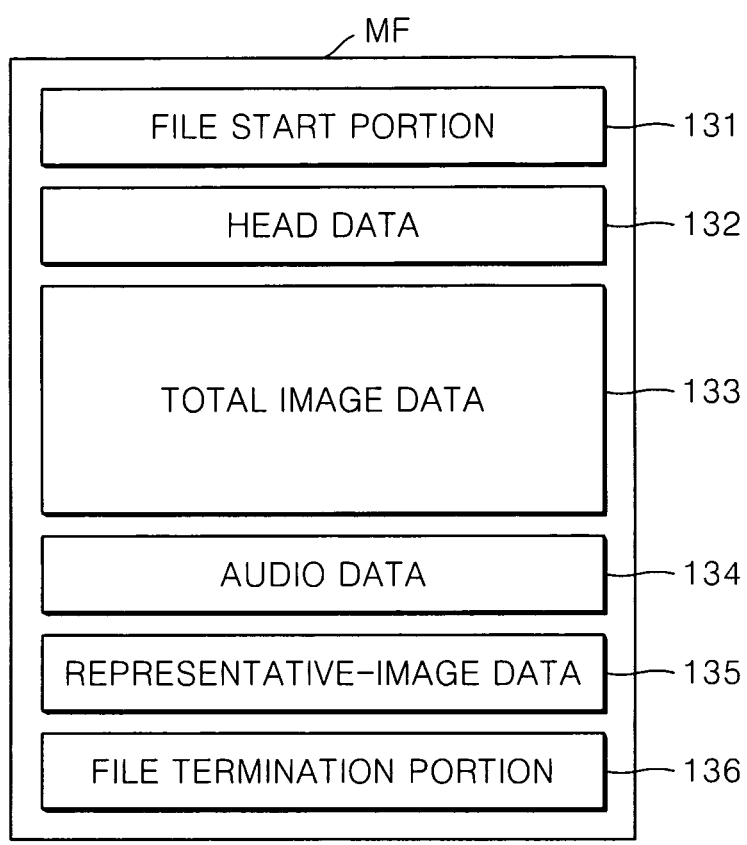
FIG. 9 is a block diagram showing an example of the structure of moving picture files completed in a moving picture photographing mode of FIG. 6.

Referring to FIG. 9, a file start portion 131, head data 132, total image data 133, audio data 134, representative-image data 135, and a file termination portion 136 are stored in a moving picture file MF completed in the moving picture photographing mode (step S52 of FIG. 5). The file start portion 131 includes data indicating the start of a file. The head data 132 includes data indicating a file format. The total image data 133 and the audio data 134 are multiplexed with each other.

The representative image frames of a GIF (graphics interchange format) obtained in step S619 of FIG. 6 is stored in the representative-image data 135. The representative image frames can be stored at a position different from the moving picture file as the GIF. The file termination portion 136 includes data indicating the termination of a file.

Figure 10:
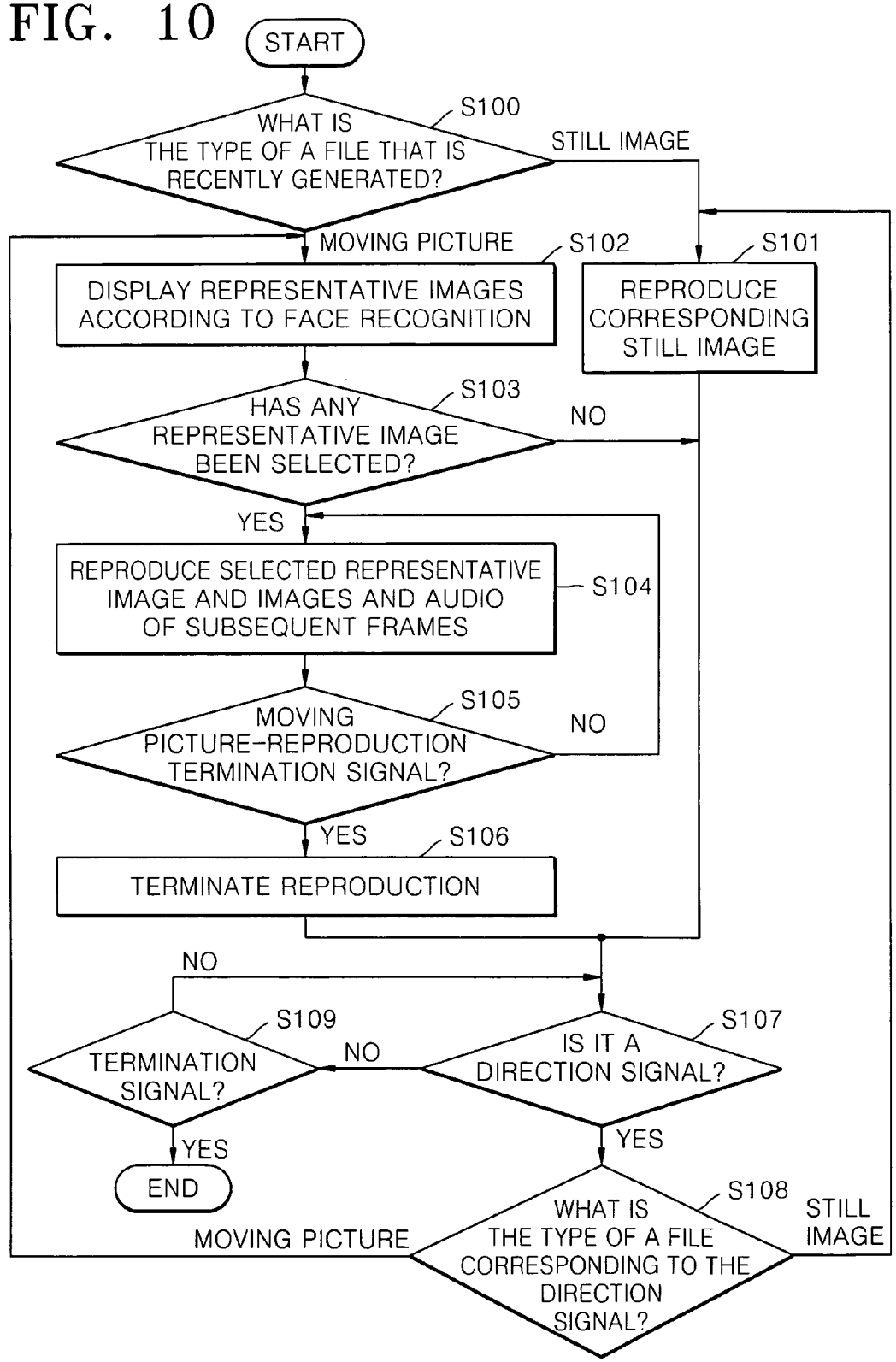
FIG. 10 is a flow chart for explaining an example of the algorithm of a reproduction mode in the step of performing a corresponding mode of FIG. 4.
Figure 11:
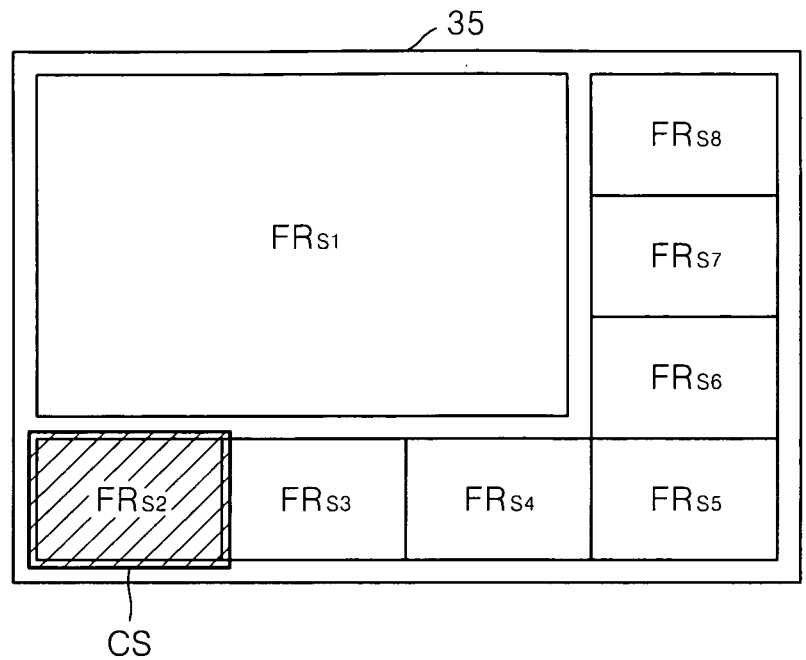
FIG. 11 illustrates a first example of displaying representative images in step S102 of FIG. 10.
Figure 12:
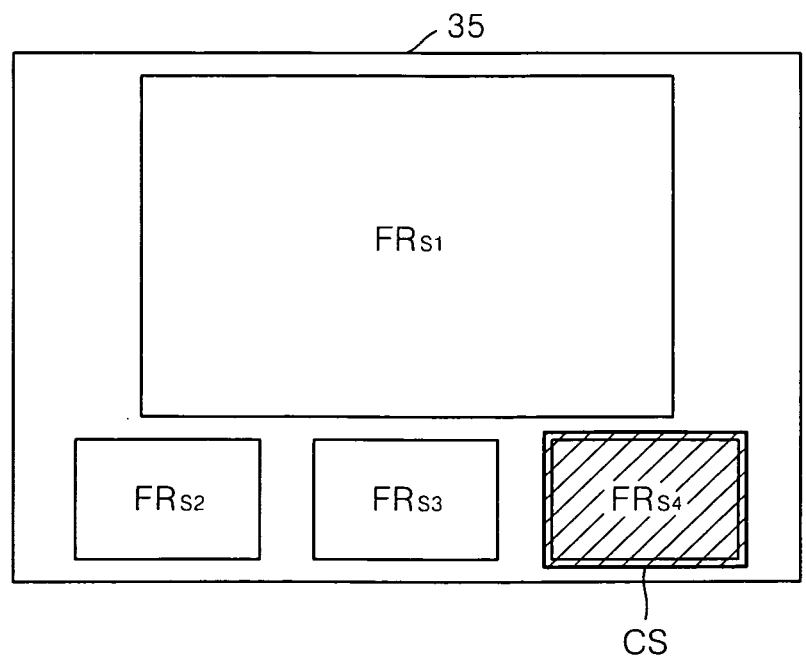
FIG. 12 illustrates a second example of displaying representative images in step S102 of FIG. 10.
Figure 13:
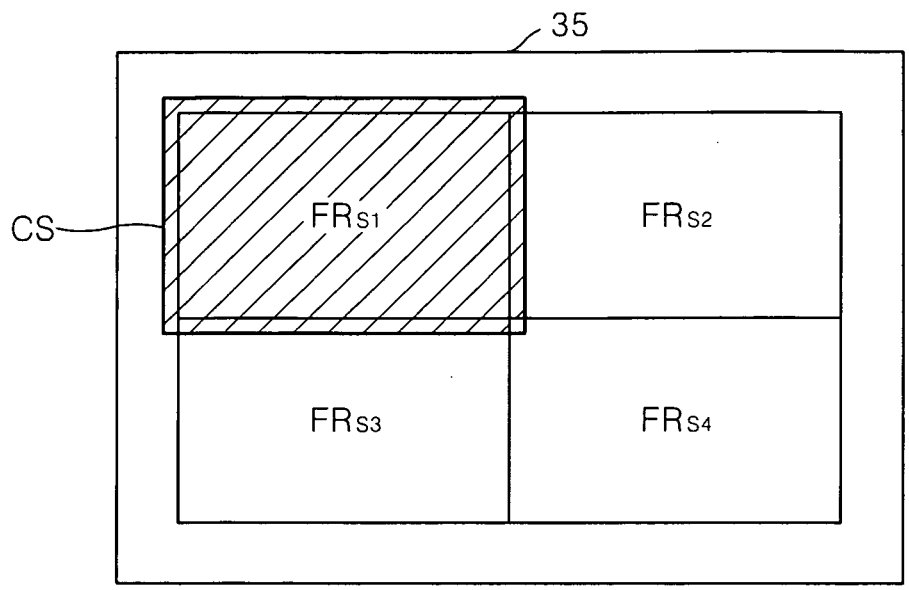
FIG. 13 illustrates a third example of displaying representative images in step S102 of FIG. 10.
Figure 14:
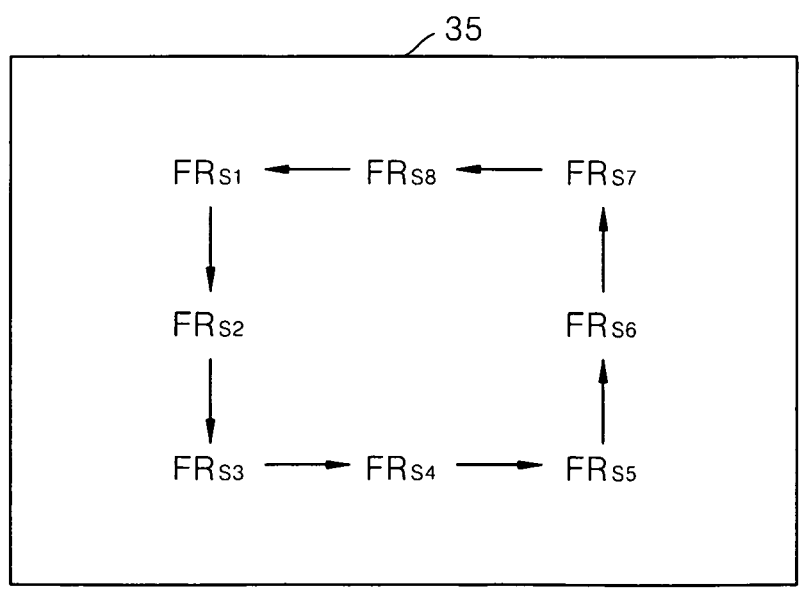
FIG. 14 illustrates a fourth example of displaying representative images in step S102 of FIG. 10.

FIG. 10 is a flow chart for explaining an example of the algorithm of a reproduction mode in the operation of performing a corresponding mode of FIG. 4. FIG. 11 illustrates a first example of displaying representative images in step S102 of FIG. 10. FIG. 12 illustrates a second example of displaying representative images in the operation S102 of FIG. 10. FIG. 13 illustrates a third example of displaying representative images in the operation S102 of FIG. 10. FIG. 14 illustrates a fourth example of displaying representative images in the operation S102 of FIG. 10.

Referring to FIG. 10-14, in the algorithm of the reproduction mode, the digital signal processor 507 determines the type of a file to be reproduced first because the file is recently generated in step S100. When the type of a file to be reproduced in step S100 is a still image, the digital signal processor 507 reproduces a corresponding still image in step S101. When the type of a file to be reproduced in step S100 is a moving picture, the following steps S102-S106 are performed. In step S102, the digital signal processor 507 displays representative images according to the face recognition.

In FIGS. 11-13, all images of the representative image frames are simultaneously or substantially simultaneously displayed on a screen to indicate a moving picture file. Referring to FIG. 11, while a representative image of the first frame $FR_{S1}$ is displayed large at the center of the color LCD panel 35, the other representative images $FR_{S2}$ through $FR_{S8}$ are displayed small at the lower and left sides thereof.

Referring to FIG. 12, while a representative image of the first frame $FR_{S1}$ is displayed large at the center of the color LCD panel 35, the other representative images $FR_{S2}$ through $FR_{S8}$ are displayed small at the lower side thereof. Referring to FIG. 13, a screen of the color LCD panel 35 is divided into four areas and four representative images $FR_{S1}$ through $FR_{S4}$ are displayed in the respective four areas.

In FIG. 14, images of the representative images $FR_{S1}$ through $FR_{S8}$ are sequentially displayed as a GIF to indicate a moving picture file. When any one representative image is selected by a user during which the images of the representative image frames are displayed to indicate the moving picture file in step S103, the digital signal processor 507 reproduces the image of a selected representative image and the images of the subsequent frames and audio files in step S104.

For example, as shown in FIG. 11, when the second representative image frame $FR_{S2}$ is selected using an active cursor CS in step S103, the digital signal processor 507 reproduces the image of a selected second representative image frame $FR_{S2}$ and the images of the subsequent frames and audio files in step S104. In this case, the fourth representative image frame $FR_{S4}$ is not the final frame. Likewise, as shown in FIG. 13, when the first representative image frame $FR_{S1}$ is selected using the active cursor CS in step S103, the digital signal processor 507 reproduces the image of a selected first representative image frame $FR_{S1}$ and the images of the subsequent frames and audio in step S104.

When the images of the representative images $FR_{S1}$ through $FR_{S8}$ are sequentially displayed to indicate a moving picture file as shown in FIG. 14, if a user's selection is made during which any one representative image frame is displayed in step S103, the digital signal processor 507 reproduces the image of a selected representative image frame and the images of the subsequent frames and audio files in step S104. As a result, the user can conveniently reproduce a moving picture file.

When a moving picture-reproduction termination signal is generated in step S105, the digital signal processor 507 terminates the reproduction of a moving picture in step S106. When the reproduction of any one still image file or moving picture file is completed, the digital signal processor 507 determines wither a direction signal or a termination signal according to the user's manipulation is generated in steps S107 and S109.

When the direction signal is generated in step S107, the digital signal processor 507 determines the type of a file corresponding to the direction signal in step S108. When the type of a file to be reproduced in step S108 is a still image, the digital signal processor 507 performs step S108 and the subsequent operations. When the type of a file to be reproduced in step S108 is a moving picture, the digital signal processor 507 performs step S102 and the subsequent operations.

Figure 15:
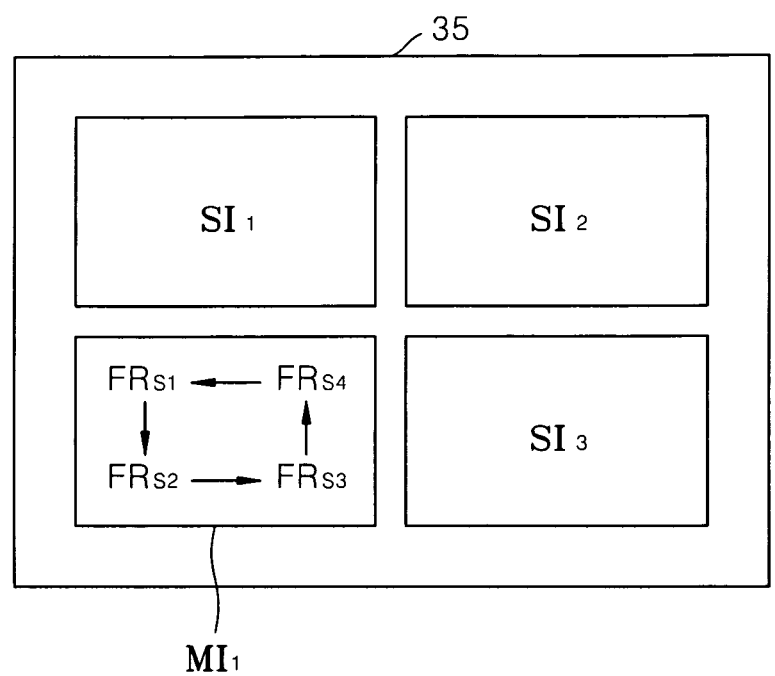
FIG. 15 illustrates that index images of three still image files and index representative images of one moving picture file in the reproduction mode of an index-menu format.

FIG. 15 illustrates that index images of three still image files $SI_1$-$SI_3$ and index representative images $FR_{S1}$-$FR_{S4}$ of one moving picture file $MI_1$ in the reproduction mode of an index-menu format. When all four files are moving picture files, index representative images of each of the four moving picture files are displayed in each of the four areas.

As can be appreciated from the above, the method of controlling a digital image processing apparatus and the digital image processing apparatus using the method according to the embodiments of the present invention enable a user to easily ascertain the content of a corresponding moving picture file while viewing the representative image frames in which faces of different persons exist. Also, the user does not need to briefly reproduce a moving picture to know the content of the moving picture file. That is, the user does not need to briefly reproduce more moving picture files to find a moving picture file having a desired content. As a result, the user can more readily find a moving picture file having a desired content.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method of controlling a digital image processing apparatus that performs a moving picture photographing mode and a reproduction mode, the method comprising:

during an operation of capturing and storing images of a series of unit frames in a moving picture file in the moving picture photographing mode:

capturing images of the series of unit frames;

detecting a representative set of face frames in the series of unit frames where each of the detected face frames of the representative set of face frames includes one or more faces of different persons than are included in at least one of the other unit frames of the representative set of face frames in the operation of capturing and storing images of a series of unit frames in the moving picture file in the moving picture photographing mode; and storing the images of the series of unit frames in the moving picture file;

the method further comprising:

storing representative image frames including face frames selected from the detected representative set of face frames in the moving picture photographing mode; and displaying images of the stored representative image frames to indicate the moving picture file in the reproduction mode.

2. The method of claim 1, wherein, in the step of storing representative image frames, the representative image frames are stored in a recording medium with the moving picture file.

3. The method of claim 1, wherein, in the step of storing representative image frames, the representative image frames are combined in a graphics interchange format and stored in the recording medium.

4. The method of claim 1, wherein the step of detecting a representative set of face frames comprises:

determining whether a new face exists in the present unit frame by comparing the detected face with faces existing in the detected representative set of face frames if a face is detected in a present unit frame, a new face being determined to exist if the detected face is of a person whose face is not already included in at least one of the other frames of the representative set of face frames; and if a new face is determined to exist in the determining step, calculating a total area of a face in the present unit frame.

5. The method of claim 1, wherein, in the step of storing representative image frames, face frames selected in order of largeness of the total face area are included in the representative image frames.

6. The method of claim 1, wherein, in the step of storing representative image frames, a first frame, the selected face frames, and a final frame are included in the representative image frames.

7. The method of claim 1, wherein, in the step of storing representative image frames, when a face exists in a first frame or a final frame, each of the selected face frames includes a newer face compared to the first frame or final frame.

8. The method of claim 1, wherein, in the step of displaying images of the stored representative image frames, all images of the representative image frames are simultaneously displayed on a screen to indicate the moving picture file.

9. The method of claim 1, wherein, in the step of displaying images, images of the representative image frames are sequentially displayed to indicate the moving picture file.

10. A digital image processing apparatus that performs a moving picture photographing mode and a reproduction mode, the digital image processing apparatus comprising:

a digital processor operable to control the digital image processing apparatus;

a non-transitory memory having stored thereon a program by which the digital processor operates, the program comprising:

a program portion to perform an operation of capturing and storing images of a series of unit frames in a moving picture file in the moving picture photographing mode;

a program portion to, during the operation of capturing and storing images of a series of unit frames, capture images of the series of unit frames;

a program portion to, during the operation of capturing and storing images of a series of unit frames, detect a representative set of face frames in the series of unit frames where each of the detected face frames of the representative set of face frames includes one or more faces of different persons than are included in at least one of the other unit frames of the representative set of face frames in the operation of storing images of a series of frames in the moving picture file in the moving picture photographing mode;

a program portion to, during the operation of capturing and storing images of a series of unit frames, store the images of the series of unit frames in the moving picture file;

a program portion to store representative image frames including face frames selected from the detected representative set of face frames in the moving picture file during the moving picture photographing mode; and a program portion to display images of the stored representative image frames to indicate the moving picture file in the reproduction mode.

11. The digital image processing apparatus of claim 10, wherein, when the representative image frames are stored, the representative image frames are stored in a recording medium with the moving picture file.

12. The digital image processing apparatus of claim 10, wherein, when the representative image frames are stored, the representative image frames are combined in a graphics interchange format and stored in the recording medium.

13. The digital image processing apparatus of claim 10, wherein when the representative set of face frames are detected, whether a new face exists in the present unit frame is determined by comparing the detected face with faces existing in the detected representative set of face frames if a face is detected in a present unit frame, a new face being determined to exist if the detected face is of a person whose face is not already included in at least one of the other frames of the representative set of face frames, and if a new face is determined to exist, a total area of a face in the present unit frame is calculated.

14. The digital image processing apparatus of claim 10, wherein, when the representative image frames are stored, face frames selected in order of largeness of the total face area are included in the representative image frames.

15. The digital image processing apparatus of claim 10, wherein, when the representative image frames are stored, a first frame, the selected face frames, and a final frame are included in the representative image frames.

16. The digital image processing apparatus of claim 10, wherein, when the representative image frames are stored, when a face exists in a first frame or a final frame, each of the selected face frames includes a newer face compared to the first frame or final frame.

17. The digital image processing apparatus of claim 10, wherein, when the images of the stored representative image frames are displayed, all images of the representative image frames are simultaneously displayed on a screen to indicate the moving picture file.

18. The digital image processing apparatus of claim 10, wherein, when the images are displayed, the images of the representative image frames are sequentially displayed to indicate the moving picture file.

19. The method of claim 1, wherein, in the step of displaying images of the stored representative image frames, when a user selects any one representative image during which images of the representative image frames are displayed to indicate the moving picture file, the selected representative image and images of subsequent frames are reproduced.

20. The digital image processing apparatus of claim 10, wherein when displaying the images of the stored representative image frames, and when a user selects any one representative image during which images of the representative image frames are displayed to indicate the moving picture file, the program portion to display images of the stored representative image frames to indicate the moving picture file reproduces the selected representative image and images of subsequent frames.

\* \* \* \* \*